(12) United States Patent
Corson et al.

(10) Patent No.: US 9,912,421 B2
(45) Date of Patent: Mar. 6, 2018

(54) BROADCAST SEEDING FOR PEER-TO-PEER NETWORKS

(71) Applicant: SONY INTERACTIVE ENTERTAINMENT INC., Tokyo (JP)

(72) Inventors: Gregory A. Corson, Foster City, CA (US); Yutaka Takeda, Foster City, CA (US); Attila Vass, Foster City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/606,968

(22) Filed: May 26, 2017

(65) Prior Publication Data
US 2017/0272187 A1 Sep. 21, 2017

Related U.S. Application Data

(63) Continuation of application No. 12/466,214, filed on May 14, 2009, now Pat. No. 9,667,364.

(60) Provisional application No. 61/053,161, filed on May 14, 2008.

(51) Int. Cl.
| | | |
|---|---|---|
| *H04H 60/91* | (2008.01) | |
| *H04H 60/27* | (2008.01) | |
| *H04H 20/08* | (2008.01) | |
| *H04H 60/11* | (2008.01) | |
| *H04N 21/658* | (2011.01) | |
| *H04N 21/4788* | (2011.01) | |
| *H04N 21/433* | (2011.01) | |
| *H04N 21/262* | (2011.01) | |
| *H04L 29/06* | (2006.01) | |
| *H04L 29/08* | (2006.01) | |

(52) U.S. Cl.
CPC ............ *H04H 20/08* (2013.01); *H04H 60/11* (2013.01); *H04L 67/104* (2013.01); *H04L 67/1076* (2013.01); *H04N 21/262* (2013.01); *H04N 21/4334* (2013.01); *H04N 21/4788* (2013.01); *H04N 21/658* (2013.01); *H04H 60/27* (2013.01); *H04H 60/91* (2013.01); *H04H 2201/40* (2013.01); *H04L 67/108* (2013.01); *H04L 69/14* (2013.01)

(58) Field of Classification Search
CPC ................................................. H04L 29/08414
See application file for complete search history.

*Primary Examiner* — Nathan Flynn
*Assistant Examiner* — Christine Kurien
(74) *Attorney, Agent, or Firm* — Kilpatrick Townsend & Stockton LLP (57) ABSTRACT

The distribution of content over a peer to peer (P2P) network can be improved by utilizing at least one broadcast of the content in order to quickly seed the P2P network. When content is first to be distributed across the network, a broadcast can be scheduled that each peer device with broadcast receiving capability and within range of the broadcast is able to receive. As soon as a peer device receives at least a portion of the broadcast content, that peer can begin redistributing the content across the P2P network. Any errors or missing portions of the received broadcast content can be corrected by requesting a copy of the missing or incorrect portion from another peer on the P2P network.

20 Claims, 8 Drawing Sheets

BROADCAST SEEDING FOR PEER-TO-PEER NETWORKS

CROSS-REFERENCE TO RELATED APPLICATIONS

The present application is a continuation of, and claims benefit and priority from U.S. patent application Ser. No. 12/466,214, filed May 14, 2009 and entitled "BROADCAST SEEDING FOR PEER-TO-PEER NETWORKS," which claims priority and benefit of U.S. Provisional Patent Application No. 61/053,161, filed May 14, 2008 and entitled "Broadcast Seeding for Peer-to-Peer Networks." The contents of each of the patent applications identified above are herein incorporated by reference in their entirety for all purposes.

TECHNICAL FIELD OF THE DISCLOSURE

The present disclosure relates to peer-to-peer networks, and more specifically to managing the efficient distribution of content over a peer-to-peer network.

BACKGROUND

Today, consumers and other users are increasingly obtaining content such as movies, music, and games via electronic distribution instead of more traditional physical media. Further, with the proliferation of portable multimedia devices and larger, cheaper memories for storing content, users are more frequently requesting this content on devices such as mobile telephones, personal data assistants (PDAs), cable boxes, console and portable gaming systems, and other such devices. The capabilities of these devices vary, and a single method of delivering content is generally not sufficient. For example, a PC might be connected to the Internet, a cable box might be connected to a digital cable service, a personal data assistant might synchronize with a PC only when docked in a docking station, and a personal gaming device might only communicate with other devices via a wireless connection when the devices are within a given range, such as 10-20 feet.

A previous approach to addressing this issue involved distributing content over a peer to peer (P2P) network. P2P networks are distributed data networks without any centralized hierarchy or organization. P2P data networks provide a robust and flexible means of communicating information between large numbers of computers or other information devices, referred to in general as nodes. In an Internet Protocol (IP)-based P2P network, for example, a server generally is used to set up a peer-to-peer IP connection. This can be time consuming and cumbersome, as the server has to keep track of IP addresses and to enable the connection. The server is effectively contacted by all possible parties and the server thus holds IP addresses associated with all the parties. When one party wishes to call a second party to obtain content, the first party contacts the server. The server finds the current IP address associated with the second party, and the connection is be routed through the server. Other P2P networks establish connections in similar ways, as known in the art. Once a peer has received content, that peer can distribute that content to other peers that may have, at best, intermittent Internet connectivity, but are able to communicate with that peer via another communication protocol.

The issue of content distribution over a P2P network is especially problematic, however, when a large amount of content is desired to be made available to a large number of users at substantially the same time. For example, a summer blockbuster or new album from a popular artist might be made available for download at a scheduled time. It is possible that millions of users might want to download the content as soon as it is released, and any given user may further want to download the content to multiple devices. Digital distribution systems, particularly P2P systems, in general perform poorly when a large file of high demand content is first released, as it takes time to distribute the content to enough peers to handle millions of downloads. In existing peer to peer or server-based download systems, a new piece of content is usually distributed using direct one-to-one connections over the Internet. When demand for a piece of content is extremely high, such an approach requires a large amount of bandwidth to distribute the content to many download servers, or in the case of a P2P network, to get the content to a large enough group of peers to service those who have not yet received the content. Further, when using an IP-based connection, a user's upload speed is generally about ten times slower than the download speed, such that the P2P network has to have at least ten times as many people with the content as are requesting the content in order for the network to run at full speed.

It thus is desirable to provide an improved approach to distributing content to devices for a P2P network.

DETAILED DESCRIPTION

Systems and methods in accordance with various embodiments can overcome these and other deficiencies in existing approaches to distributing content in an electronic environment. An approach in accordance one embodiment uses at least one broadcast system, such as an over-the-air (OTA) digital television (TV) or radio, digital cable, satellite radio, or another such broadcast system. The use of at least one broadcast system or service allows content to quickly and concurrently be delivered to an increased number of peers that are able to receive the broadcast. Such an approach not only allows a larger number of peer devices to obtain the content as soon as possible after the release, but each of these peers is then able to quickly begin distributing the content to other peers across the P2P network. Since the number of peers having the content is increased, the ratio of uploads to downloads will be improved such that the system also can perform up to the download speed of the peers. The use of broadcast media then functions as a quick-start seeding mechanism for the P2P network. The content can fairly quickly be distributed widely enough to handle the load of requests, and distributing the content to geographically dispersed peers can help to avoid localized overloading of network links to P2P or distribution servers.

Systems and methods in various embodiments can be implemented in a decentralized computing environment, which can be defined by a number of computing, processing, or other such devices interconnected to communicate with one another, wherein at least some of the devices are able to perform both client and server functions, meaning that each peer device is able to download content from other peer devices as well as to upload content to those devices. Each device in a peer-to-peer (P2P) network can be defined as a peer of every other such device within the network. For discussion purposes, each peer device within the P2P network can be referred to as a node. Additionally, each node within the P2P network can be configured to execute software having a minimum amount of substantially equivalent functionality. Therefore, nodes are able to act at least as a user of data, content, and services, and beneficially can be enabled to also act as a provider of data, content, and services across the P2P network. Certain devices, however, may not have sufficient resources to also serve the content.

Figure 1:
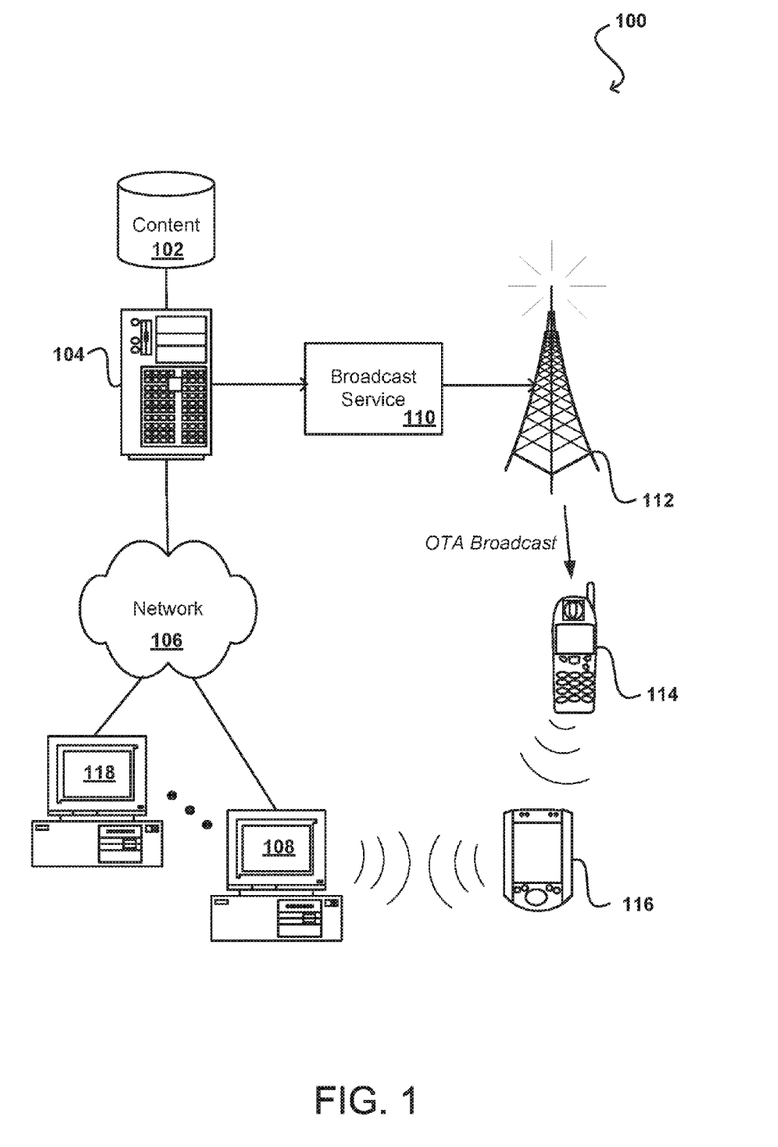
FIG. 1 illustrates components of a system for distributing content in a P2P network that can be used in accordance with one embodiment.

FIG. 1 illustrates components of a system 100 that can be used to distribute content over a peer to peer (P2P) network in accordance with one embodiment. In this example, content to be distributed across the network is stored in an appropriate data store 102. The data store can include any appropriate number of appropriate devices for storing and retrieving content as known in the art. At least one distribution server 104 is in communication with the data store 102, and is able to retrieve the content from the data store and serve the content in response to at least one request from one of the devices on the P2P network. This request can come from one or more computers 108, 118 on the P2P network via an HTTP or similar request submitted through a Web browser and received over the Internet 106, for example.

As discussed, however, there are instances where the content to be distributed will be, or has been, requested by a large number of peers. In such a case, it is desirable to distribute the content to as many peers on the network as possible. The system of FIG. 1 utilizes at least one broadcast service 110, such as an over-the-air (OTA) digital television (TV) or high definition radio, digital cable, or satellite radio broadcast service. The content to be distributed can be sent to the broadcast service 110 by the distribution server 104, and at the appropriate time can be broadcast using an appropriate broadcasting device 112, such as a broadcast tower in the case of OTA broadcasts, a satellite for satellite broadcasts, a digital broadcast server for digital television, a base station for wireless broadcast transmissions, etc. When the content is broadcast by the broadcasting device 112, any peer device listening for the broadcast and within range of the broadcast can begin storing the broadcast content. For example, the cell phone 114 in the figure is shown to have a receiver and be in range of the broadcast, such that the cell phone 114 is able to quickly receive the content. If the cell phone is set up to act as a full peer, the cell phone can begin to also serve portions of the content as soon as they are received.

For example, a personal data assistant (PDA) 116 is shown that might not have a receiver capable of receiving the broadcast, the receiver might not be turned on during the broadcast, the PDA might be out of range of the broadcast, etc. In this case, the PDA is not able to receive the broadcast, and might not yet have been able to establish a connection to the P2P network to download the content. If the phone 114 and the PDA 116 are able to communicate by a wireless connection, for example, the PDA can download the content from the cell phone as soon as the phone is in range with transmission functionality enabled. In this way, the PDA is able to get the content faster than would otherwise been possible. Further, the PDA is able to get the content without ever having been able to receive the content over the IP-based P2P network.

Another benefit is that a peer node such as the cell phone can be configured to receive and transmit broadcasts at the same time. Thus, as soon as a node receives and stores a packet, the node can then transmit that packet to other nodes. Thus, the PDA in this example can receive the entire content at almost the same time as the cell phone.

As shown in the figure, a peer device such as a computer 108 connected to the Internet can receive the content from the broadcast, from another peer device over a wireless or other connection, or from the P2P network 106. Even if the computer is not able to receive the broadcast, the computer might be able to download the content from the PDA 116 that received the content. As soon as the computer begins to receive the content, the computer can begin transmitting the content over the P2P network 106, such as to computing device 118. The computer also can transmit the information wirelessly or otherwise to other devices, depending upon the configuration.

An advantage to such a flexible approach to receiving content is that nodes are able to obtain portions of the content from various sources as soon as they are available. For example, the distribution server 104 can begin seeding the P2P network with the content at or around the same time the content is being broadcast. While a node is downloading from another node across the network, the node can still be listening for the broadcast. If the node is only part way through the download from another node, and the remaining portion of the content is detected to be about to be sent via broadcast, the node can switch to receive the remaining portion(s) of the content via the broadcast. Similarly, if a node is downloading wirelessly from another node and a faster Internet connection becomes available, the node can switch over to the faster connection. In some embodiments, the node can attempt to download different portions of the file in parallel from the two sources (or more).

Another advantage to utilizing broadcasting systems and services is that the data transmission speed is continually increasing. For example, several countries have adopted the Advanced Television Systems Committee, Inc., (ATSC) Digital Television (DTV) standard for over the air (OTA) digital transmissions. One version of the standard allows for OTA data transmission at a rate of 19.39 megabits of data per second (Mbps) per channel. A broadcast also can utilize two or more channels (either to each broadcast different portions of a file or to broadcast the same file with some time delay (i.e., half the broadcast time) such that devices can grab different portions of the file), which provides a data transmission speed of at least 38 Mbps. Digital cable broadcasts also can transmit content at around 36 Mbps to any subscriber tuning in at that time. Either approach can be much faster than downloading from a peer, which even when the network is running at full capacity generally will be limited by the speed of the connection which is usually limited by a 10 Mbps or slower connection over the Internet, and can be further limited by direct wireless connections. Further, in P2P networks the sum of the speeds of all downloaders can not exceed the sum of the speeds of all uploaders. Since the upload speed is usually less than download speed, this means that the P2P users will not get full speed until there are considerably more people seeding the content than there are downloading the content.

One potential problem with broadcasting content, however, is that broadcasting in general is a one-way transmission mechanism. While digital cable allows for two-way communication, and broadcast mechanisms can have back channels or other ways for two-way communication, this two-way communication is not a fast two-way connection as users have come to expect when using, for example, the Internet. For example, consider a scenario wherein a peer is downloading a video game and something happens where one of the packets is not received properly. While in a television broadcast this might not be of great concern, lost data can cause a video game to not function properly. In a broadcast approach, there is no quick way for the user to recover this lost packet. Since such errors are generally random, peers with lost packets generally will have lost different packets. Thus, if there are a large number of users, then there can be a large number of requests to resend specific packets of data. For large files, then, it can take a substantial amount of time to resend each lost packet. Further, broadcasting in certain technological areas can be expensive, and the broadcasting might only be able to be done so often or for so long due to practical matters. In many areas or at certain times of day, the demand for broadcast bandwidth can exceed the amount of bandwidth available. This may make purchasing additional bandwidth to rebroadcast lost packets too expensive. Schedules imposed by broadcasters may also limit how soon error packets can be retransmitted. Thus, a user could be left waiting until the next scheduled broadcast to actually be able to use the content.

Figure 2:
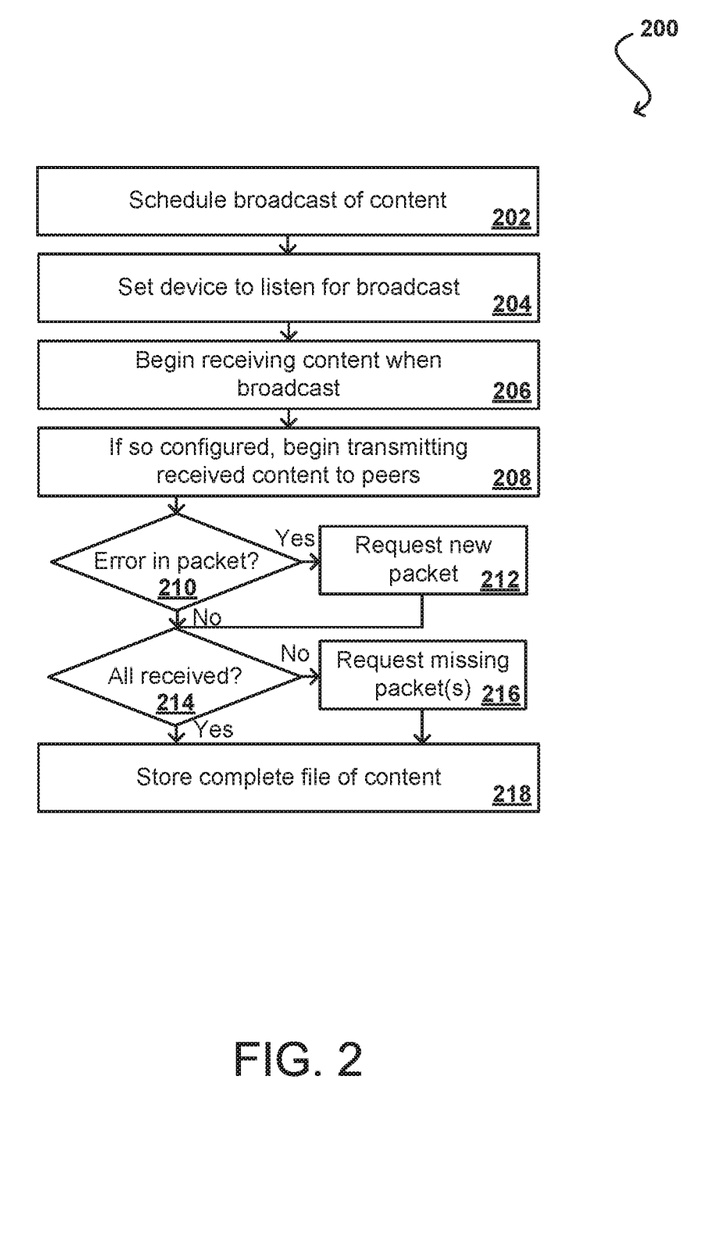
FIG. 2 illustrates steps of a process that can be used in accordance with one embodiment.

Systems and methods in accordance with various embodiments overcome such issues, however, as nodes are able to retrieve the lost packets from other nodes that have already received that packet. FIG. 2 illustrates steps of an approach 200 for providing and correcting broadcasts in accordance with one embodiment. In this example, content is scheduled to be broadcast at a particular time 202. A user wishing to receive the content causes at least one device to listen for the broadcast 204. In some cases, a user may request a particular file to be downloaded at the first opportunity, might select a file from a schedule, or might pre-order content to be delivered when available, for example. The device also can be configured to listen for the content on other channels, such as a P2P network. The listening device then is able to receive and store the content as the broadcast occurs 206. If the device is able to act as a full peer to provide content to other peers, the device can also start transmitting the received content to any other peer from which a request is received 208. During the broadcast, the device can check to see whether each packet was received properly 210, using an approach such as described herein. If a packet is not received properly, the device can reject the packet and request to receive the packet again 212. The device can request to obtain this packet from another peer, and/or can send a request to have at least the lost packet of content rebroadcast. Once the broadcast is finished, the device can determine whether all the packets were received 214. If not, the device can request to obtain any missing packet(s) from another peer, and/or can send a request to have at least the lost packet of content rebroadcast 216. The device will continue to request any missing or rejected packets until the entire file is received properly 218.

Nodes also are able to send packets of the content back and forth even if neither node has all the content. If two nodes receive the content via broadcast, such an approach allows the nodes to receive the content when desired and have any errors corrected quickly from each other, via the P2P network, or from other peers, such that the content is available substantially when desired, with the small amount of delay possibly not even being noticeable by the user of the device. In broadcast only systems, each node would have to wait for the next broadcast. In traditional P2P systems, each node would have to wait or the content to be available on another node, and even then the download time might be very long due to issues discussed above.

Figure 3A:
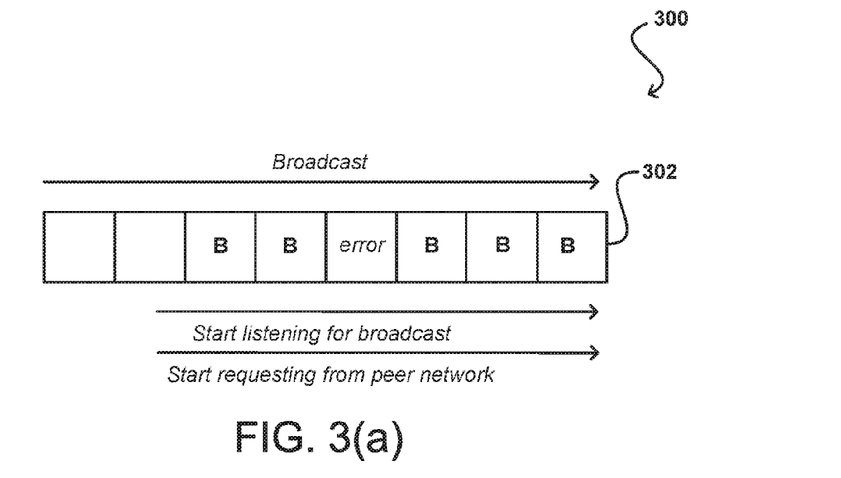
FIGS. 3(a)-3(c) illustrates a process for obtaining portions of content distributed over a P2P network that can be used in accordance with one embodiment.
Figure 3B:
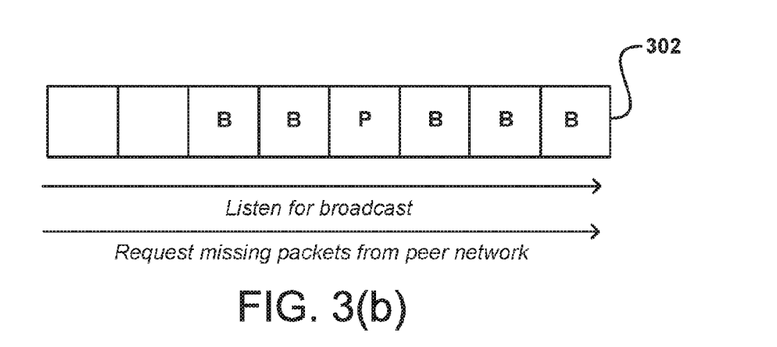
Figure 3C:
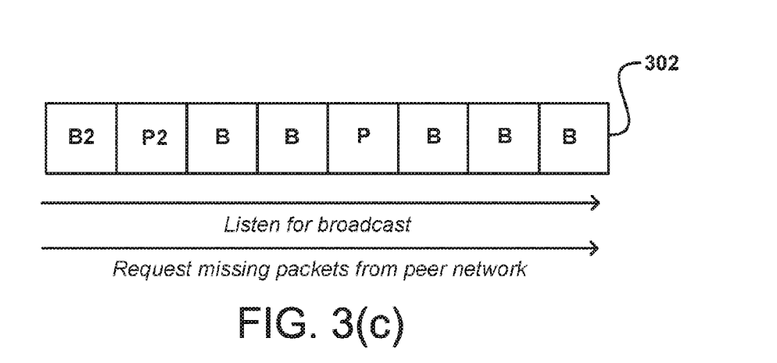

FIGS. 3(a)-3(c) illustrate an example 300 of how a node might receive portions of a file of content 302 in accordance with one embodiment. This example is simplified and exaggerated for purposes of explanation. A peer device wishing to download a file can receive over the network or the broadcast a schedule indicating when the file will be broadcast. Around that time, the device can begin listening for the broadcast. The device also can concurrently try to receive the content from other sources, such as from other peers across the P2P network. In FIG. 3(a), the device began listening for the broadcast after the broadcast was already in progress. This can occur when the device was powered off or otherwise unable to receive the broadcast at the beginning. In this case, the device is able to download the rest of the broadcast, in this example downloading the final six portions of the file from the broadcast (B). As can be seen, one of the portions was not received properly. Determination of an error can be done using any of a number of approaches known or used in the art, such as by using a checksum or error correction code with a packet to determine whether the packet was received properly. If a portion of the file received from the broadcast contains an error, the portion can simply be rejected or deleted.

As shown in FIG. 3(b), at the end of the broadcast the device can continue to request the remainder of the content from the P2P network, or another device, and can listen for the next broadcast of the missing portions. In some cases, the device can send a request to have the missing portions rebroadcast. A peer receiving data over a broadcast network will only request error packets or other packets that were missed (i.e., because the peer began listening after the broadcast had started) from the P2P network. Packets which were expected to be broadcast in the near future might not be requested via P2P, reducing unnecessary load on the P2P network. In FIG. 3(b), the device is able to obtain the portion that was rejected for having an error from another peer (P). This can be, for example, a peer capable of transmitting the portion directly over a wireless connection, or a peer over the P2P network. As shown in FIG. 3(c), the device continues to listen for a broadcast, or listens at the scheduled time, and attempts to download the remaining information from another peer. In this example, the device was able to download one of the missing portions from a second peer (P2), and was able to finally grab the initial portion via a rebroadcast (B2) of that portion. It should be apparent in light of the teachings and suggestions contained herein that a number of variations and alternatives for receiving portions of the content can exist as well.

Figure 4:
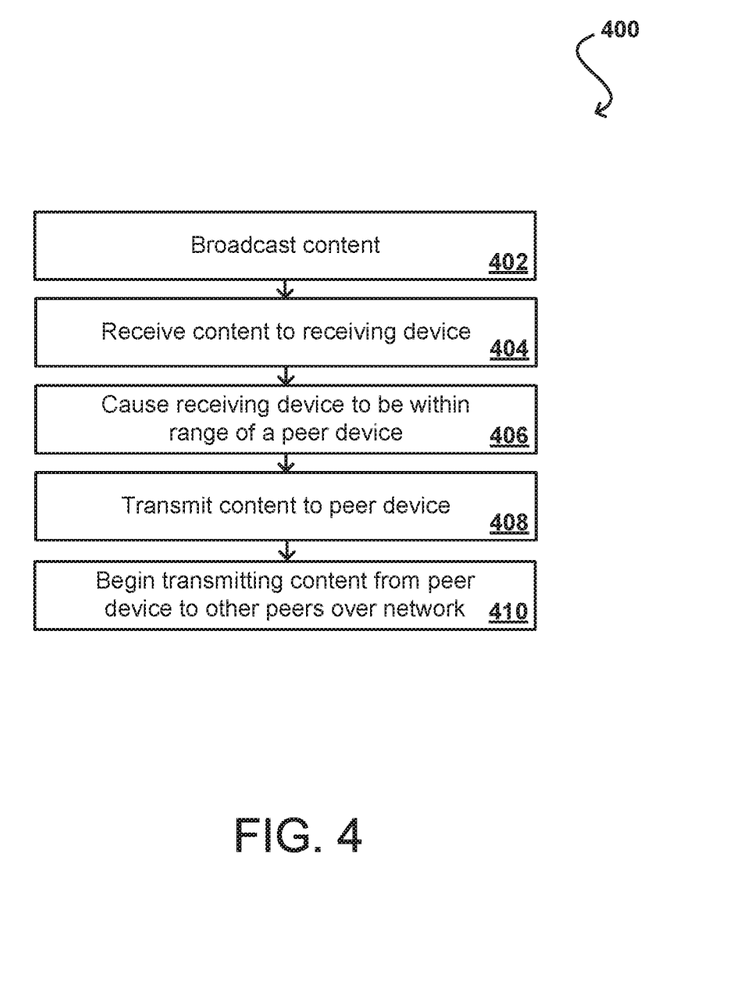
FIG. 4 illustrates steps of a process for distributing content that can be used in accordance with one embodiment.

FIG. 4 illustrates another example process 400 that can be used to quickly seed a P2P network that can be used in accordance with one embodiment. In this example, content is broadcast 402 and received by a device having a receiver for receiving the broadcast 404. The device receiving the broadcast might not have a sufficient connection to allow for transmission of the content over the P2P network. At some point, however, the device can come within range of a peer on the P2P network 406. If the receiving device and peer are able to communicate using a wired or wireless connection, the receiving device can transmit the content to the peer device 408. Since the peer device is connected to the P2P network, the peer device can begin transmitting the content to peers across the network as soon as a portion of the content is received from the receiving device 410. In this way, a peer device that did not receive the broadcast is not only able to quickly obtain the content, but then is able to begin serving the content to others on the network faster than would otherwise have been possible.

In some cases, broadcasts can be selected to seed particular areas. For example, a national broadcast can be used for certain content, but this can be extremely expensive. For other content, broadcasts can be done locally, such as in areas or access networks where a large number of requests are likely to be received. Broadcasts can be selected and scheduled differently in different areas based on factors such as demand and the number of people that are able to receive the broadcast. Since some P2P networks can be configured to grab content using the closest peers, instead of the peers with the fastest connection or highest quality of service, this can allow specific areas to be seeded more quickly, and reduce the overall amount of traffic and congestion on the network. Further, in cases where different companies provide access in different areas, it can be attractive for those companies to keep the traffic within their network as much as possible, reducing the amount of bandwidth needed to be purchased from other networks and reducing network congestion at the points where these networks interconnect.

Only a subset of devices in a certain area will generally have receivers. Further, not all of the devices with receivers will receive the first broadcast. Accordingly, the broadcast in one embodiment can be repeated a number of times, such as until a number of peers are seeded, the network speed reaches a certain level, the number of requests drops to a certain level, a pre-selected number of times, or any other appropriate number of times. In some embodiments, the broadcast also can be received by dedicated download servers in specific areas to help seed those areas.

In some broadcast approaches there can be a dedicated channel, such that a device can always listen to a particular channel without the need for a tuner or an interface for selecting the appropriate channel. In other embodiments, broadcasts can be scheduled using any free channel at any time, such as late at night when a particular station is not broadcasting on a given channel. A peer device can have software for obtaining the schedule, tuning to the channel near the appropriate time, and listening for the content. The device also can have multiple tuners for downloading concurrently from multiple channels. If a device does not have such capability built in, the device can utilize an accessory such as a USB tuner that is able to pick up OTA TV and radio broadcasts.

Further, certain peer devices can have internal or external components that allow the devices to communicate content directly to other devices. These can include components for transferring wirelessly, such as by using a Wi-Fi connection, or a wired connection, such as may be established by a USB cable. If a device has an ATSC transmitter/receiver, the device can be configured to utilize an ATSC back channel to communicate with other devices that can listen on that back channel. The back channel in one embodiments provides the speed of an ATSC transmission, but has a limited range of transmission. In other embodiments, a device might be able to utilize a common channel to also broadcast information, using an approach that would not interfere with the original broadcast such as using a small portion of the frequency, utilizing spatial or time dimension multiplexing, etc.

In one embodiment, if a first peer is able to transmit content to a second peer using more than one transmission type, such as over the Internet or using an ATSC back channel, the first device can select the transmission type that is fastest or provides the highest quality of service. If the first peer is transmitting to the second peer over the Internet, and the second peer comes within ATSC back channel broadcast range, the first peer can switch to the faster ATSC back channel. If the devices are capable, the transmission can also occur concurrently over both channels in order to transmit the entire content even more quickly.

In an embodiment where a user might have multiple devices, the user can set each device to listen for the content and download the content when available. The user's devices then can synchronize as soon as possible. Such an approach allows a user to utilize a device with a receiver to obtain the broadcast and then transmit the content locally to a desired device, such as a gaming console or digital video recorder.

In one embodiment, the broadcast can utilize a quick start approach that allows users listening at different times to begin accessing the content more quickly. For example, time slicing can be used to send the first packet or portion of the content very often, such as once a minute, and then subsequent portions less frequently. Such an approach allows more users to access the content immediately, such as to start watching a movie download shortly after the time of request. Approaches for quick starting content delivery for broadcast are described, for example, in co-pending U.S. Patent Publication No, 2002/0147979, entitled "Method and System for Providing Instant Start Multimedia Content," filed Jan. 22, 2001, which is hereby incorporated herein by reference.

In another embodiment, content such as audio or video files can be buffered with sufficient time to allow any errors in the broadcast to be corrected by requesting the missing or lost packets or portions from other peers. In certain types of content such as video, small errors may not be very noticeable or objectionable. In this case a user can view the content immediately, with small errors, then allow the system to correct errors later for repeat viewing (such as when purchasing a movie that will be saved on the user's system for long term use/replay).

Another way to further increase the availability of content across a P2P network is to pre-seed the network. For example, content could be released or broadcast to various devices before the content is to be made available for use. A parameter or other approach to content access control can be set that does not allow the content to actually be accessed, used, viewed, listened to, etc., before the scheduled time of release.

In one embodiment, systems can utilize "pre-seeding" for the distribution using one or more distribution channels. For example, copies or initial pieces of content, referred to as "seeds," can be released, transferred, or broadcast to various devices before the content is to be made available for use. In one embodiment, these seeds are distributed to peer devices with specific or predetermined functionality, as may be provided through various combinations of hardware and/or software. Such a device then can become a "fast peer"

seeder to assist in the distribution of the content, in order to reduce the likelihood of the P2P system becoming bogged down at the time of distribution. In one embodiment, a pre-seeding "master" device is used to select the client devices to act as the "fast peers," and provide the seed(s) to the selected client devices. The master device can also serve as a fallback mechanism in case the pre-seeding was not sufficient, in order to avoid issues with the P2P distribution.

Figure 5:
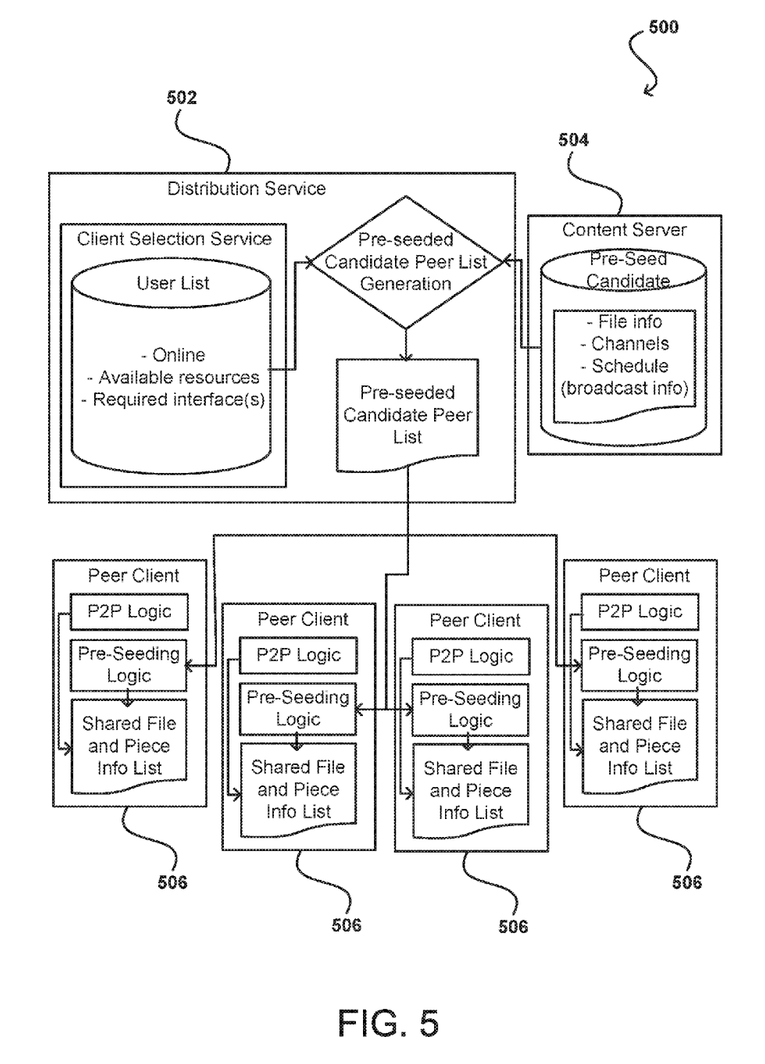
FIG. 5 illustrates example components that can be used for pre-seeding a download in accordance with one embodiment.

FIG. 5 illustrates an example configuration 500 that can be used to pre-seed a P2P network in accordance with one embodiment. In this example, at least one content server 504 is provided that includes information for the distribution, and is able to provide the content to be seeded and/or distributed. The content server 504 can include, or have access to, a data store that includes information for the pre-seed candidates, including information such as file information, the channels to be used for distribution, and the schedule or other information for the broadcast. The content server can be in communication with a distribution service 502, which can include any of a number of devices and applications necessary to distribute the content. The service can take any appropriate form, such as a Web service or software service available over a network such as the Internet or the P2P network. The distribution service can include a client selection service that has access to a data store, which can include information such as a list of users and/or peer devices, as well as information about those users or devices. The user/device information can include, for example, whether the users/devices are online or otherwise available on the network, which resources the particular peer has that can be used for functions such as distribution, and whether the device has the appropriate interface(s) for the distribution. The data store also can include other appropriate information, such as whether a user has selected to serve as a pre-seed peer device, whether the user has authorized certain resources to be available, etc. The distribution service also can include various other components, such as a signaling component utilizing a service switching point (SSP)-based architecture. The service also can include an administration tool for managing aspects of the service, and one or more file servers, such as a local file server and a file information ("FileInfo") server. As discussed later herein, the service also can include at least one tracking component able to monitor aspects of the distribution.

The distribution service can utilize information from the content server and the client selection service to generate a list of candidate peers to be used for pre-seeding. The list can be used by the distribution service 502 to contact the candidate peer devices 506, determine whether those peers are currently able to act as pre-seeding peers, and provide the pre-seeding content or "seed" to each candidate able to perform the desired functionality. Each selected peer 506 can include logic both for the P2P and the pre-seeding functionality, which can store the appropriate information to a shared file list that is able to track the pieces of content that are received, to be distributed, etc. Each peer also can include various other applications useful for P2P distribution, such as applications for digital rights management, communication, and authentication. The peers also can include libraries for pre-seeding, P2P client functionality, and P2P connectivity, for example. If a peer is to act as an origin or source for a broadcast, the peer also can include a peer application with broadcasting support.

When a download is to be added to the P2P network, the content to be downloaded can be provided or "seeded" to one or more origin peer devices. In some embodiments, only a portion of the content will be provided to the origin peer devices, such as the same portion or different portions to different devices. The content also can be provided to one or more broadcast servers that can be used to augment and/or supplement the content download or distribution. When broadcast servers are used, information regarding the content to be broadcast and the broadcasting schedule can be provided to the pre-seeding logic on each selected peer client, such that adjustments can be made to account for the broadcast. The origin peers can create a file such as a FileInfo metadata file for files that are obtained locally. In the case or pre-seeding, this file can be sent along with the schedule, and can be served to clients by the FileInfo server, for example.

An administration ("admin") tool or other such component can control or manage the process at various steps. For example, the admin tool can instruct an origin peer to create a FileInfo file and schedule for the data broadcast (or "datacast"). The admin tool also can instruct the origin peer to begin the seeding process. The admin tool also can perform other functions, such as to send the FileInfo file to the FileInfo server.

Figure 6:
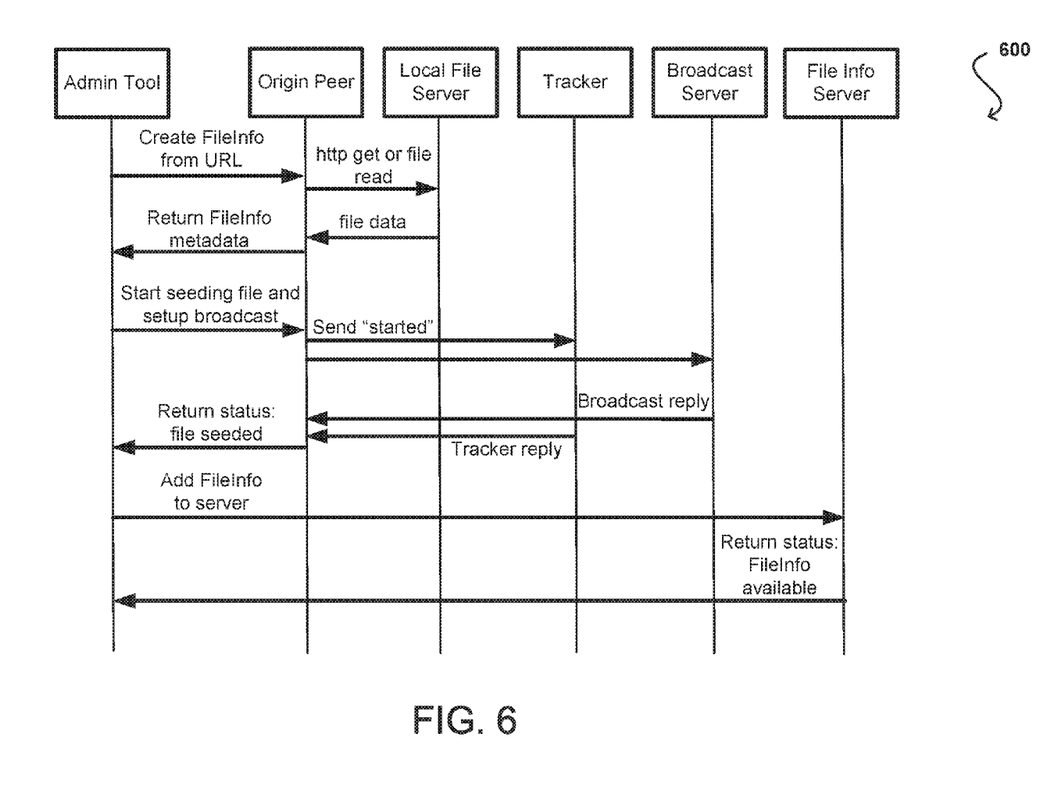
FIG. 6 illustrates an example process flow for pre-seeding a download that can be used in accordance with one embodiment.

FIG. 6 illustrates an example process flow 600 that can be used to add a download for distribution using such components. In this example, the admin tool instructs an origin peer to create the FileInfo file, here using a uniform resource locator (URL). The origin peer can contact a local file server to obtain the necessary information, such as by using an "http get" or file read command. The local file server returns the requested data, whereby the origin peer creates the FileInfo file and forwards the FileInfo metadata file to the admin tool. The admin tool can subsequently instruct the origin peer to begin seeding the file and setup the broadcast. The origin peer can send a "started" message for the seeding to the tracking component and each broadcast server, to which each component can send a reply back to the origin peer. The origin peer then can return a status message to the admin tool, such as whether the seeding process for the file succeeded. If successful, the FileInfo file can be passed to the FileInfo server, which can return a message indicating that the FileInfo metadata file is available for the download/distribution process.

If the pre-seeding logic is available and activated, "downloader" peer devices can tune to the broadcast channel, or otherwise configure to receive the broadcast, and can listen or otherwise receive the subscribed datacast at the scheduled time. If the data stream is ready and acquired, peers can supplement the download process using the datacast. To download a file, the downloader peers obtain the FileInfo metadata file from the FileInfo server. The peer devices then can connect to the appropriate tracker server to indicate that the peers have started the download, or are in a "started" or similar state. The tracker server can respond with a list of peers that are already in the downloading process. The file, or portions thereof, then can be transferred between the peers with the optional supplemental download from the broadcast channel. The peers can notify the appropriate tracker server or component upon completion of the file download.

Figure 7:
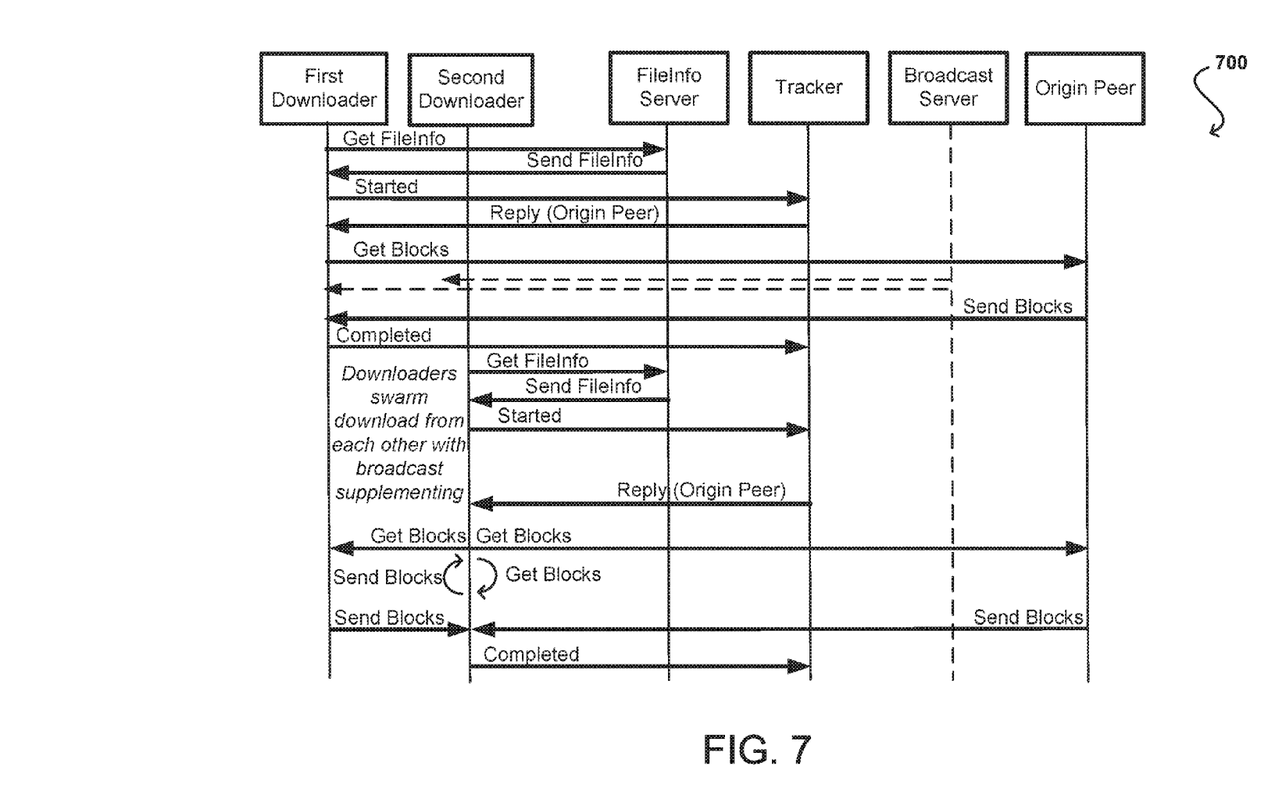
FIG. 7 illustrates an example process flow for distributing content across peers of a P2P network that can be used in accordance with one embodiment.

FIG. 7 illustrates an example process flow 700 that can be used for a download or distribution of content after a pre-seeding process as discussed herein. In this example, the first downloading peer ("downloader") sends a request to the FileInfo server to get the FileInfo metadata file. Once the first downloader receives the file from the FileInfo server, the first downloader can notify the appropriate tracking component that the downloading process has started. The tracking component can respond with the appropriate origin peer for the content to be downloaded. The first downloader can send a request such as a "get blocks" or similar request to the identified origin peer to obtain blocks or other portions of the content. While the first downloader is receiving the blocks from the origin peer, or at any other appropriate time, the first, second, and any other downloaders also can receive blocks from the broadcast server via a scheduled broadcast. When a downloader receives all the blocks, or the entire file or piece of content, the downloader can send a message to the tracking component that the download has completed successfully and the peer's status has changed to a state such as "seeding." Additional downloaders can "swarm" the download from each other once at least one of the downloaders has the content, while any broadcast-based download can supplement the data acquisition process. For example, a second downloader can send a request to get the FileInfo metadata file from the FileInfo server, when can return the FileInfo metadata file such that the second downloader can send a started notification to the tracking component. The tracking component can send a reply identifying the origin peer, as well as the first downloader and any other downloaders for the content. The second downloader then can send a request for blocks to the first downloader, the origin peer, and/or any other downloader having content. The second downloader can receive blocks from any or all of these sources. Once the second downloader has received all the blocks, the second downloader can notify the appropriate tracking component that the download has completed and the status of the downloader has changed to "seeding" or a similar state. The other downloaders can utilize a similar process to obtain all portions of the content to be downloaded.

Figure 8:
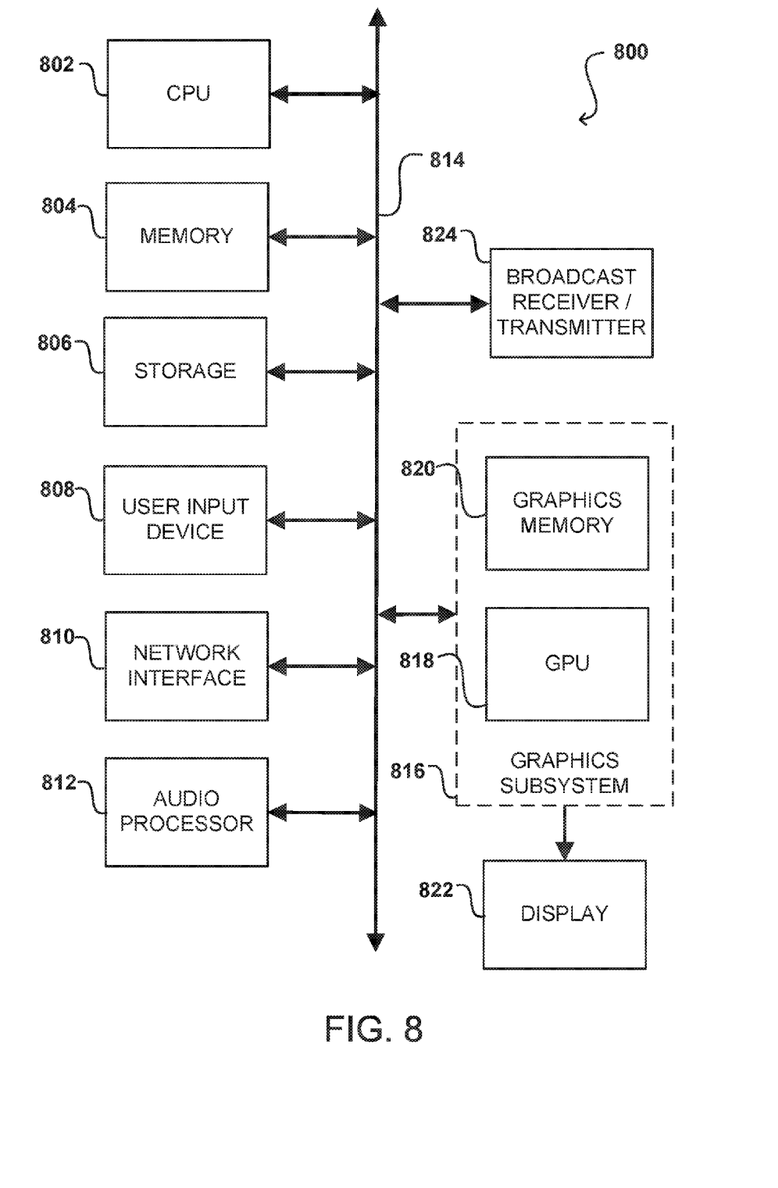
FIG. 8 illustrates components of a computing device that can be used in accordance with one embodiment.

FIG. 8 illustrates components of an example peer device 800 suitable for use with various embodiments, such as a personal computer, video game console, personal digital assistant, or other digital device. The peer device 800 includes a central processing unit (CPU) 802 for running software applications and optionally an operating system. The CPU 802 may be comprised of one or more homogeneous or heterogeneous processing cores. A memory 804 stores applications and data for use by the CPU. A storage device or medium 806 provides non-volatile storage for applications and data and may include fixed disk drives, removable disk drives, flash memory devices, and CD-ROM, DVD-ROM, Blu-ray, or other such storage devices. User input devices 808 can communicate user inputs from one or more users to the peer device 800, examples of which may include keyboards, mice, joysticks, touch pads, touch screens, still or video cameras, and/or microphones. A network interface 810 allows the peer device 800 to communicate with other devices via an electronic communications network, and may include wired or wireless communication over local area networks and wide area networks such as the Internet. An audio processor 812 can be used that is adapted to generate analog or digital audio output from instructions and/or data provided by the CPU 802, memory 804, and/or storage 806. The components of the peer device 800 can be are connected via one or more data buses 514.

A graphics subsystem 816 in some devices can be further connected with the data bus 814 and the components of the peer device 800. The graphics subsystem 816 can include a graphics processing unit (GPU) 818 and graphics memory 820. The graphics memory 820 can include a display memory (e.g., a frame buffer) used for storing pixel data for each pixel of an output image. The graphics memory 820 can be integrated in the same device as the GPU 818, connected as a separate device with the GPU 818, and/or implemented within the memory 804. Pixel data can be provided to graphics memory 820 directly from the CPU 802. Alternatively, the CPU 802 provides the GPU 818 with data and/or instructions defining the desired output images, from which the GPU 818 generates the pixel data of one or more output images. The data and/or instructions defining the desired output images can be stored in the memory 804 and/or graphics memory 820. In an embodiment, the GPU 818 includes 3D rendering capabilities for generating pixel data for output images from instructions and data defining the geometry, lighting, shading, texturing, motion, and/or camera parameters for a scene. The GPU 818 can further include one or more programmable execution units capable of executing shader programs.

The graphics subsystem 816 can periodically output pixel data for an image from graphics memory 820 to be displayed on display device 822. The display device 822 can be any device capable of displaying visual information in response to a signal from the peer device 800, including CRT, LCD, plasma, and OLED displays. The peer device 800 can provide the display device 822 with an analog or digital signal.

In certain embodiments, the CPU is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications.

Certain devices can further have a broadcast transmitter and/or receiver 824 able to transmit and/or receive at least one type of broadcast. The transmitter/receiver can include devices able to receive broadcast transmissions such as over-the-air (OTA) digital television (TV) or radio broadcasts, digital cable broadcasts, satellite radio broadcasts, and other such broadcasts. Where necessary, the transmitter/receiver can include, or be in communication with, an appropriate tuner for tuning to an appropriate channel. In some devices, software can be stored in the memory or storage that can allow the receiver to listen for specific broadcasts. In some devices, the receiver/transmitter allows the peer device to transfer content over a wireless, infrared, or other connection with another device.

The peer network and devices can be implemented in a wide variety of operating environments, and can be configured to execute any of a number of applications and take advantage of any of a number of services. While peer devices have been described, the P2P, broadcast, and related networks can utilize any of a number of general purpose computing devices, such as may include notebook or personal computers running various operating systems, as well as cellular, wireless, and handheld devices supporting a number of networking and messaging protocols. A network can include devices executing applications for purposes such as content and database management. A network can include various other electronic devices capable of communicating via a network. The network can be, for example, a local area network or a wide-area network, and can include or access other networks such as the Internet, a public switched telephone network, an infrared network, a wireless network, and any combination thereof.

Any device on the network can include a computer-readable storage media reader connected with, or configured to receive, a computer-readable storage medium, representing local, remote, fixed, and/or removable storage devices as well as storage media for storing, transmitting, and/or managing computer-readable information. Storage media and computer readable media for containing code can include any appropriate media, implemented using any method or technology for storage and/or transmission of information such as computer readable instructions and content, including but not limited to EEPROM, flash memory, RAM, ROM, CD-ROM, digital versatile disk (DVD), Blu-ray, or other optical storage, magnetic disk storage, magnetic cassettes, magnetic tape, or any other medium which can be used to store information and which can be accessed by a peer or network device. Based on the disclosure and teachings provided herein, a person of ordinary skill in the art will appreciate other ways and/or methods to implement the various embodiments.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
   determining, from a plurality of peer devices on a peer to peer (P2P) network providing access to first content, a set of peer devices for distributing the first content over the P2P network;
   determining that the set of peer devices has received second content distributed by a broadcast from a broadcast system that is independent of the P2P network, wherein a first peer device in the set of peer devices is operable to transmit the first content to a second peer device on the P2P network after at least a portion of the second content is received by the first peer device, and wherein the second peer device is unable to receive the second content distributed by the broadcast from the broadcast system;
   upon providing the second peer device with metadata information about the set of peer devices, determining that the second peer device has initiated a download process for obtaining the first content; and
   responsive to initiating the download process for obtaining the first content, sending, to the second peer device, a response identifying one or more peer devices in the set of peer devices from which to download the first content, wherein the second peer device obtains the first content based on the one or more peer devices identified by the response.

2. The method of claim 1, wherein the second peer device obtains the first content by downloading the first content from the one or more peer devices identified by the response.

3. The method of claim 1, wherein determining that the second peer device has initiated the download process and sending the response are performed by a server computer.

4. The method of claim 1, wherein determining the set of peer devices for distributing the first content over the P2P network is performed by a computer system, and wherein determining the set of peer devices includes:
   generating a list of peer devices that are candidates for distributing the first content over the P2P network; and
   communicating with each peer device in the list of peer devices to determine the set of peer devices that are capable of distributing the first content over the P2P network.

5. The method of claim 4, further comprising:
   receiving, from the second peer device, a request for the metadata information; and
   providing, to the second peer device, in response to the request, the metadata information about the set of peer devices.

6. The method of claim 5, further comprising:
   based on a response from the second peer device, determining that the second peer device has completed the download process; and
   updating the metadata information to indicate that the second peer device is included in the set of peer devices for distributing the first content over the P2P network.

7. The method of claim 6, wherein the request is a first request, and wherein the method further comprises:
   receiving, from a third peer device on the P2P network, a second request for the metadata information, wherein the third peer device is unable to receive the second content distributed by the broadcast from the broadcast system; and
   providing, to the third peer device, in response to the second request, the updated metadata information about the set of peer devices.

8. The method of claim 1, wherein the metadata information identifies each of the set of peer devices that are capable of distributing the first content over the P2P network.

9. A system comprising:
   a processor; and
   a memory including one or more instructions that, upon execution by the processor, cause the processor to perform operations comprising:
   determining, from a plurality of peer devices on a peer to peer (P2P) network providing access to first content, a set of peer devices for distributing the first content over the P2P network;
   determining that the set of peer devices has received second content distributed by a broadcast from a broadcast system that is independent of the P2P network, wherein a first peer device in the set of peer devices is operable to transmit the first content to a second peer device on the P2P network after at least a portion of the second content is received by the first peer device, and wherein the second peer device is unable to receive the second content distributed by the broadcast from the broadcast system;
   upon providing the second peer device with metadata information about the set of peer devices, determining that the second peer device has initiated a download process for obtaining the first content; and
   responsive to initiating the download process for obtaining the first content, sending, to the second peer device, a response identifying one or more peer devices in the set of peer devices from which to download the first content, wherein the second peer device obtains the first content based on the one or more peer devices identified by the response.

10. The system of claim 9, wherein determining the set of peer devices for distributing the first content over the P2P network is performed by a computer system, and wherein determining the set of peer devices includes:
    generating a list of peer devices that are candidates for distributing the first content over the P2P network; and communicating with each peer device in the list of peer devices to determine the set of peer devices that are capable of distributing the first content over the P2P network.

11. The system of claim 10, wherein the operations further comprise:
   receiving, from the second peer device, a request for the metadata information; and
   providing, to the second peer device, in response to the request, the metadata information about the set of peer devices.

12. The system of claim 11, wherein the operations further comprise:
   based on a response from the second peer device, determining that the second peer device has completed the download process; and
   updating the metadata information to indicate that the second peer device is included in the set of peer devices for distributing the first content over the P2P network.

13. The system of claim 12, wherein the request is a first request, and wherein the operations further comprise:
   receiving, from a third peer device on the P2P network, a second request for the metadata information, wherein the third peer device is unable to receive the second content distributed by the broadcast from the broadcast system; and
   providing, to the third peer device, in response to the second request, the updated metadata information about the set of peer devices.

14. The system of claim 9, wherein the metadata information identifies each of the set of peer devices that are capable of distributing the first content over the P2P network.

15. A non-transitory computer readable medium storing instructions that, upon execution by a processor, cause the processor to:
   determine, from a plurality of peer devices on a peer to peer (P2P) network providing access to first content, a set of peer devices for distributing the first content over the P2P network;
   determine that the set of peer devices has received second content distributed by a broadcast from a broadcast system that is independent of the P2P network, wherein a first peer device in the set of peer devices is operable to transmit the first content to a second peer device on the P2P network after at least a portion of the second content is received by the first peer device, and wherein the second peer device is unable to receive the second content distributed by the broadcast from the broadcast system;
   upon providing the second peer device with metadata information about the set of peer devices, determine that the second peer device has initiated a download process for obtaining the first content; and
   responsive to initiating the download process for obtaining the first content, send, to the second peer device, a response identifying one or more peer devices in the set of peer devices from which to download the first content, wherein the second peer device obtains the first content based on the one or more peer devices identified by the response.

16. The non-transitory computer readable medium of claim 15, wherein determining the set of peer devices for distributing the first content over the P2P network is performed by a computer system, and wherein determining the set of peer devices includes:
   generating a list of peer devices that are candidates for distributing the first content over the P2P network; and
   communicating with each peer device in the list of peer devices to determine the set of peer devices that are capable of distributing the first content over the P2P network.

17. The non-transitory computer readable medium of claim 16, wherein the instructions that, upon execution by the processor, further cause the processor to:
   receive, from the second peer device, a request for the metadata information; and
   provide, to the second peer device, in response to the request, the metadata information about the set of peer devices.

18. The non-transitory computer readable medium of claim 17, wherein the instructions which, upon execution by the processor, further cause the processor to:
   based on a response from the second peer device, determine that the second peer device has completed the download process; and
   update the metadata information to indicate that the second peer device is included in the set of peer devices for distributing the first content over the P2P network.

19. The non-transitory computer readable medium of claim 18, wherein the request is a first request, and wherein the instructions which, upon execution by the processor, further cause the processor to:
   receive, from a third peer device on the P2P network, a second request for the metadata information, wherein the third peer device is unable to receive the second content distributed by the broadcast from the broadcast system; and
   provide, to the third peer device, in response to the second request, the updated metadata information about the set of peer devices.

20. The non-transitory computer readable medium of claim 15, wherein the metadata information identifies each of the set of peer devices that are capable of distributing the first content over the P2P network.

* * * * *